United States Patent [19]

Nightingale

[11] 4,406,781
[45] Sep. 27, 1983

[54] PROCESS FOR THE SEPARATION OF MINERAL SUBSTANCES

[76] Inventor: E. Richard Nightingale, 132 Glenside Rd., Murray Hill, N.J. 07974

[21] Appl. No.: 319,626

[22] Filed: Nov. 9, 1981

[51] Int. Cl.³ .............................................. B04C 5/26
[52] U.S. Cl. .................................................. 209/211
[58] Field of Search .......................... 209/211, 207, 9

[56] References Cited

U.S. PATENT DOCUMENTS

| | | | |
|---|---|---|---|
| 1,773,997 | 8/1930 | Green . | |
| 2,378,152 | 6/1945 | Nagelvoort | 209/165 |
| 2,409,216 | 10/1946 | Lee . | |
| 2,506,300 | 5/1950 | Klepetko et al. . | |
| 2,506,301 | 5/1950 | Klepetko et al. . | |
| 2,591,830 | 4/1952 | Klepetko et al. . | |
| 2,701,641 | 2/1955 | Krijgsman | 209/211 |
| 3,096,275 | 7/1963 | Tomlinson | 209/211 |
| 3,353,673 | 11/1967 | Visman | 209/211 |
| 3,485,356 | 12/1969 | Burr | 209/211 |
| 3,637,637 | 1/1972 | Saccardo et al. | 526/130 |
| 3,637,639 | 1/1972 | Zinniel et al. . | |
| 4,164,467 | 8/1979 | Liller | 209/211 |
| 4,222,529 | 9/1980 | Long | 209/211 |
| 4,265,741 | 5/1981 | Im | 209/211 |
| 4,279,743 | 7/1981 | Miller | 209/211 |
| 4,303,526 | 12/1981 | Moro et al. | 209/211 |

*Primary Examiner*—Tim R. Miles
*Attorney, Agent, or Firm*—Burns, Doane, Swecker and Mathis

[57] ABSTRACT

Provided is a process and apparatus for the separation of solid mineral substances. Particular applicability is found in the separation of resins from resin-bearing coal material. The resins are effectively separated by treating the resin-bearing coal with a non-solvent liquid, e.g., water, and then subjecting the resultant slurry to centrifugal force, e.g., in a classifying cyclone separator. The step of subjecting the resin-bearing coal slurry to centrifugal force is effected concomitantly in the presence of a gas such as air. A quality resin concentrate which is usable without subsequent refining can thereby be recovered.

39 Claims, 3 Drawing Figures

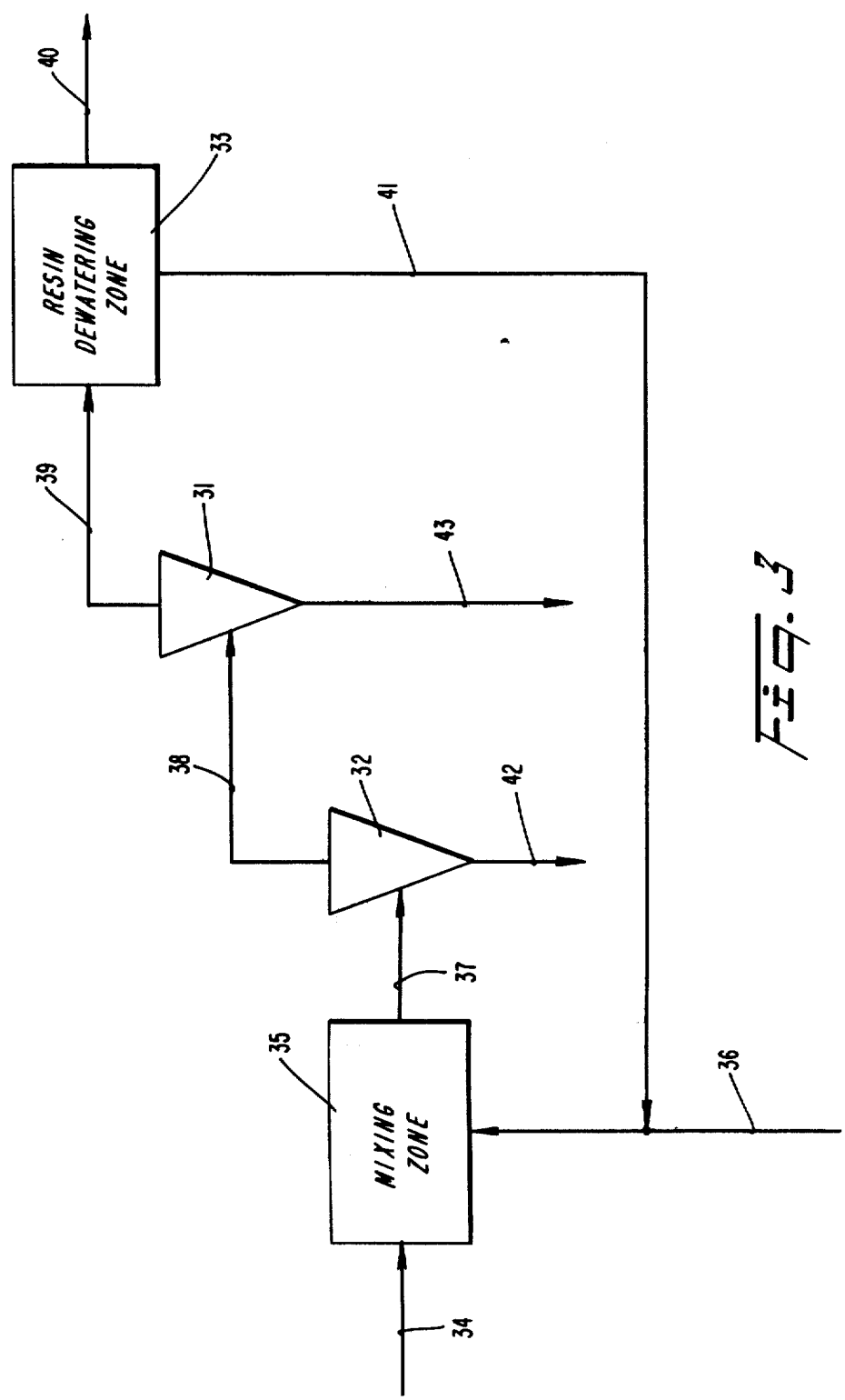

PROCESS FOR THE SEPARATION OF MINERAL SUBSTANCES

BACKGROUND OF THE INVENTION

1. Field of the Invention

The present invention broadly pertains to the separation of mineral substances. More particularly, the present invention pertains to the effective recovery of resins from resin-bearing coal through the application of centrifugal force.

2. Background of the Invention

Efficient and effective recovery or separation of one solid mineral substance from another has long presented problems. This is particularly true in the recovery of resins from resin-bearing coal. Certain coal deposits, such as those of the Wasatch Plateau and Book Cliffs fields of Utah, contain a substantial quantity of natural fossil resins which, in a purified condition, has utility in adhesives, coatings, printing inks, synthetic rubber compositions, traffic marking compounds, water proofing agents and the like. However, the resin, as it occurs in nature, is intimately admixed with the coal and the problem of separating it from the coal economically and on a commercial scale has presented serious difficulties to the art.

In its natural state, the resin occurs in small lumps, lenticular masses and in fracture planes of various thicknesses within the coal seams. Numerous investigators have demonstrated the fossil resins are considerably more friable than the coal with which they are admixed. When the coal is removed in the course of customary mining procedures, the majority of the recoverable resin is released by the fracture of the coal along the resin planes and by the tumbling action of the coal handling machinery which dislodges resinous particles adhering to the coal particles. A large portion of the recoverable resin is thereby liberated from the coal in the course of ordinary handling so that additional crushing of mine-run coal is not normally required to enhance resin recovery. Certain investigators, however, have cited the necessity for crushing coal to specified screen sizes for optimal resin recovery when employing certain recovery techniques. The added crushing step detracts from the economy of such techniques.

It is known in the art that resins may be separated from coal by means of froth flotation, air-lift flotation, float/sink separations employing inorganic salt solutions, and the like. None of these procedures, however, is capable of producing a high-purity resin concentrate. As well, most of the prior art processes for separating resin from coal are economically infeasible because they fail to satisfactorily resolve three basic problems, namely (1) since these resins are more dense than water, they cannot be effectively separated in quiescent water due to the lower specific gravity of water, (2) a high-purity resin concentrate cannot be effectively separated from the coal in agitated or upward flowing classifying systems, however slight the agitation, due to the contamination of the resin concentrate by appreciable quantities of coal fines and slimes, and (3) float/sink separations using aqueous solutions of inorganic salts are impractical because of the large volumes of salt solutions to be handled, the product and co-product contamination, the salt losses incurred, and the not inconsiderable environmental pollution problems associated with the waste solution disposal.

In U.S. Pat. No. 1,773,997, issued to Green, there is disclosed the separation of resin by a froth flotation process using one of several flotation agents to help separate the resins from the coal. While variations on this method are in commercial application today, the resin concentrate product so obtained is relatively impure, seldom, if ever, exceeding 50 weight percent resin, and with up to 40% by weight or more sorbed moisture. The resin concentrate obtained by such flotation procedure is so impure that it must be further refined as by solvent extraction, and the drying and solvent refining of such an impure resin concentrate is both tedious and economically disadvantageous.

In U.S. Pat. No. 2,378,152, issued to Nagelvoort, it is disclosed that wetted coal can be separated from unwetted resins using either upwardly flowing suspensions or air agitation. However, the resin concentrate of the disclosed invention is also relatively impure, containing only about 60% resin, and requires still further refining.

U.S. Pat. No. 2,409,216, issued to Lee, discloses an improvement on the refining of resin using a basic froth flotation process by heating the froth flotation concentrate to the order of 250° to 300° C. in order to melt the concentrate, following which a solvent refining process may be employed.

U.S. Pat. No. 2,506,300, issued to Klepetko et al., seeks to circumvent the unsatisfactory performance of froth flotation and other prior art processes for preparing fossil resin concentrates by employing a continuous solvent leaching and extraction process. However, because of the large quantities of coal fines which must be handled and the necessity for desolventizing and drying the coal fines and slimes, this process is economically disadvantageous and has never achieved successful commercial implementation.

In U.S. Pat. No. 2,506,301, issued to Klepetko et al., there is disclosed a flotation process not employing flotation agents or wetting agents and using air-lift flotation in place of mechanical agitation. This process tends to minimize crushing and attrition of the friable resin particles present in mechanically agitated flotation processes. The process demonstrates an improved recovery of larger sized resin particles, i.e., 28 × 100 mesh, over that in conventional mechanical systems, but still provides an impure flotation product which admittedly requires still further refining, e.g., by solvent refining.

In U.S. Pat. No. 2,591,830, issued to Klepetko et al., again it is sought to circumvent the unsatisfactory performance of froth flotation and prior art processes and the economic infeasibility of direct solvent refining processes by preparing resin concentrates using a basic sedimentation technique combined with a frothing agent which assists the collection of resin particles at the surface of the sedimentation tank. While the method is simpler than the froth flotation process, the quality of resin concentration is not significantly improved. The concentrate may contain a somewhat higher percentage of non-resin contaminants than a concentrate, e.g., produced in a specially built flotation plant, but it is stated that the concentrate is readily amenable to refining by solvent extraction.

In U.S. Pat. No. 3,637,639, issued to Zinniel et al., still another process is described for the continuous solvent extraction of resin from coal. This process employs special extraction and recovery equipment and accomplishes the primary segregation of coal fines from solutions of the resin dissolved in suitable organic solvents by means of liquid cyclonic separators in a classical two phase (solid coal/resin solution) separation. However, the process is laborious, equipment intensive and relatively quite expensive to operate.

Accordingly, it is an object of the present invention to provide an improved method for separating or recovering one solid mineral substance from another solid mineral substance, and in particular, an improved method for recovering a resin concentrate from resin-bearing coal. The provision of particular apparatus for carrying out the improved process is also an object of the present invention.

Another object of the present invention is to provide a method for recoverying a high-purity resin concentrate from resin-bearing coal, which resin concentrate is suitable for use without any further refining.

Still another object of the present invention is to provide an improved method for recovering resin from coal without concern as to the particle size of the coal material to be treated.

Yet another object of the present invention is to provide a most efficient and economically feasible method for recovering resins from resin-bearing coal.

These and other objects, as well as the scope, nature and utilization of the invention, will be apparent to those skilled in the art from the following description, the accompanying drawings, and the appended claims.

SUMMARY OF THE INVENTION

In accordance with the foregoing objectives, there is provided a process and apparatus for separating an admixture of solid mineral substances, which process comprises mixing the admixture of solid mineral substances with a non-solvent liquid in order to form a slurry, and then subjecting the slurry to centrifugal force in the presence of a gas. By "non-solvent liquid" is meant a liquid which is not a solvent for either mineral substance. For example, in the separation of resins from coal material, the non-solvent liquid with which the slurry is formed does not act as a solvent for either the resins or coal material. Thereby the separation which occurs upon the application of the centrifugal force is not the classical two phase separation of solid mineral/mineral solution, but is a separation between the solid mineral substances, e.g., solid coal/solid resin particles in a four phase system (solid coal, solid resin, water and air).

In a preferred embodiment of the present invention, resins are effectively separated from resin-containing coal material by mixing the resin-containing coal material with a non-solvent liquid, preferably water, to form a slurry. The preferred solids content of the slurry is from about 1 weight percent to about 50 weight percent solids, more preferably from about 2 weight percent to about 20 weight percent solids, and most preferably from about 3 to about 15 weight percent. The slurry is then passed to a separation zone wherein its resin particle content is separated from the coal materials by centrifugal force, preferably that obtained via cyclonic separators such as classifying liquid cyclones. Such separation is possible since in the presence of a gas such as air the resin particles collect at the water/air interface and are removed to the overflow orifice of the cyclone. If classifying cyclones are utilized in the separation process, they are preferably operated at a pressure of from about 4 to about 60 p.s.i. and more preferably at a pressure from about 5 to about 40 p.s.i.

The separated resin particles can then be dewatered in a suitable dewatering zone. This zone may comprise screens, sieves, and the like. It is preferred that this dewatering zone comprises sieves or screens having openings between from about 35 and about 150 microns in size (between about 400 to about 100 mesh).

If desired, the separated coal materials can similarly be dewatered, with both the dewatered resin concentrate and the dewatered coal materials being removed from the process.

It has been found that resin concentrates containing in excess of 75 percent by weight, typically in excess of 95 weight percent and not atypically in excess of 99.5 weight percent, can be prepared with the process of the present invention without resorting to expensive and time consuming solvent extraction and refining techniques which are required with prior art processes.

BRIEF DESCRIPTION OF THE DRAWING

FIG. 3 schematically depicts a set-up in accordance with one embodiment of the present invention wherein a first centrifugal separating zone feeds directly to a second centrifugal separating zone.

DETAILED DESCRIPTION OF THE PREFERRED EMBODIMENTS

Figure 1:
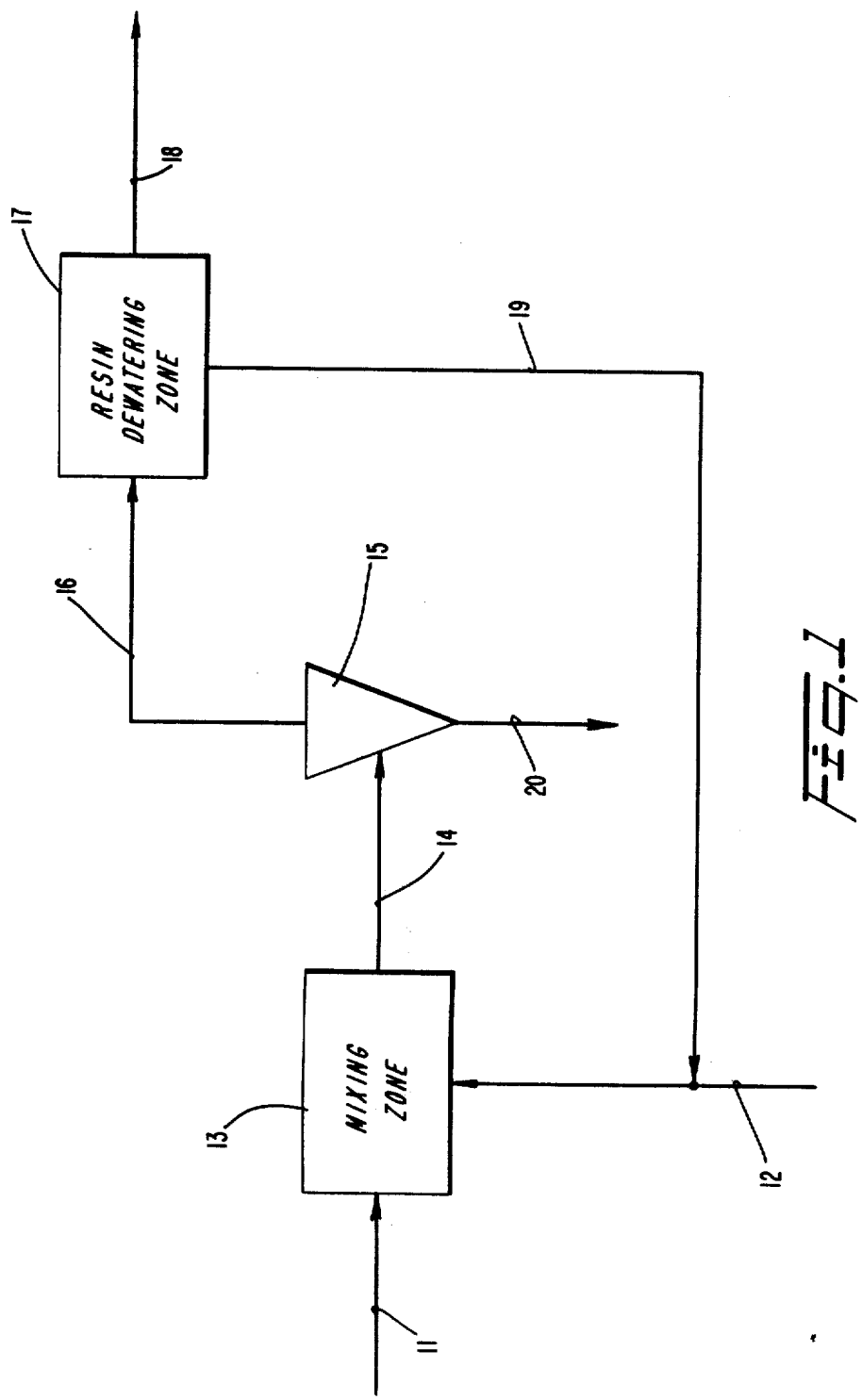
FIG. 1 schematically depicts an apparatus set-up in one embodiment of the present invention wherein a single centrifugal separating zone is employed.

The basic problem with all prior art processes for the physical separation and recovery of, for example, resins from coal, is that it has not been possible heretofore to prepare a quality mineral concentrate, e.g., containing greater than about 65% resin, and in particular one of sufficient purity so as to be usable and salable without subsequent refining. This is especially true in the recovery of resins from resin-bearing coal, wherein chemical (i.e., solvent) refining of resinous coals, with or without prior resin concentration, has always heretofore been required and has been so expensive as to result in a product of limited economic import.

It has now been discovered, however, that the disadvantages of all systems previously proposed for separating mineral substances such as resins from coal can be overcome if the, e.g., resins are separated from the coal by use of a large multiple of the earth's gravitational force, such as is present in a centrifugal field, in a non-solvent liquid medium, e.g., an aqueous medium, in which a suitable gas such as air is induced or admixed. By the proper employment of centrifugal force on such a four phase system (solid coal, solid resin, water and air), a very high purity resin concentrate containing in excess of 99.5 weight percent resin is readily prepared without the use of additives, flotation agents or chemicals.

More specifically, in the separation of resins from coal material, it has been discovered that the resin particles may be separated with amazing effectiveness from the coal with which they are admixed by treating a slurry of resin-bearing coal in a non-solvent liquid, such as water, in a centrifugal zone employing a large multiple of the earth's gravitational force such as that obtained in a liquid cyclonic separator, more commonly referred to as a cyclone, liquid cyclone, hydraulic cyclone or classifying cyclone. Such separation is effected concomitantly in the presence of a gas such as air, either as in the air core of a classifying cyclone or as air induced into the inlet along with the slurry feed.

This discovery and the invention resulting therefrom is especially surprising since it employs cyclonic separators, typically classifying cyclones, to separate two solid mineral substances both of which possess specific gravities greater than the liquid media in which they are suspended. Thus the separation so effected is obtained, not by the apparent density or gravity of the minerals, but by means of fractionating mineral particles with unwetted, hydrophobic surfaces from a second mineral with wetted, hydrophilic surfaces with which it is admixed.

The extraordinary effectiveness of the instant invention in preparing by physical means resin concentrates of such high purity as has been heretofore achieved only by solvent or chemical refining appears to result from the unexpected and unpredictable effect of air, or some other suitable gas, within the core of the cyclone which adheres to the hydrophobic, unwetted surface of the resin particles, thus overcoming the normal tendency for the resin particles to be separated and rejected along with the coal particles from the underflow orifice (apex) of the cyclone into the underflow stream of the separator. This occurs irrespective of the fact that the resin particles possess a specific gravity greater than that of the water medium.

The effect of the gas within the core of the cyclone to counteract the gravitational field within the cyclone is significant to the embodiment of this invention. Using a cyclone whose diameter is two inches and operating at a pressure of 30 pounds per square inch, resinous particles as large as two mm in diameter (ca. 10 mesh) can be easily separated from coal fines as small as about 37 microns (minus 400 mesh). Cyclone theory would indicate that resin particles (whose specific gravity ranges from 1.04 to about 1.10) larger than about 40 to 60 microns should be rejected out the underflow orifice (apex) of such a classifying cyclone and into the underflow stream.

The surprising effect of a gas such as air in the presence of a large centrifugal field on the hydrophobic or unwetted resin surface is demonstrated by the effect of wetting agents on the recovery efficiency of the process of the present invention. For example, unwetted resin particles two mm or more in diameter are easily separated from the coal with which they are admixed using the process of the present invention. However, when the resin particles are well wetted, as with an aqueous solution containing 20 to 100 ppm tannic acid, it becomes very difficult to separate resin particles larger than about 100 to 150 microns in diameter (170 to 100 mesh). While the relative purity of the resin concentrate prepared using the process of the invention in the presence of an adequate concentration of wetting agent may not diminish significantly because the more dense coal particles continue to be rejected out the apex of the cyclone into the underflow stream, the efficiency of the resin recovery diminishes dramatically due to the larger resin particles being rejected out the apex of the cyclone along with the coal particles into the underflow stream.

If the process of the present invention is attempted without utilizing air or some other suitable gas in the core of the cyclone, as by closing the apex of the cyclone with a rubber flap valve so as to prevent the induction of air up into the core of the cyclone, the cyclone suffers a "syphon effect" such that coal particles smaller than about 100 to 300 microns (100 to 50 mesh) are separated along with the resin particles out the vortex finder and into the overflow stream of the cyclone, and a very impure resin concentrate results.

Any means for inducing centrifugal force to the extent necessary to separate the resin particles from the coal particles can be suitably employed. Generally, however, a classifying cyclone whose diameter is less than about sixteen inches and whose included angle is less than about 45 degrees, and preferably less than 20 degrees, may be suitably employed, depending, of course, upon the operating pressure, which can vary, e.g., from about 4 to about 120 p.s.i.

In one embodiment of the present invention, smaller cyclones, e.g., having a diameter of less than about 6 inches, and operating at the higher pressures have been found most advantageous in rejecting the smaller coal particles out the apex and thus resulting in recovery of a purer resin concentrate with fewer coal slimes in the cyclone overflow (vortex) stream. In practice, it has been discovered that liquid cyclones smaller than six inches in diameter and operating at pressures greater than about six to eight pounds per square inch may readily yield a resin concentrate satisfactory for commercial use and sale.

The particular magnitude of centrifugal force required in a cyclonic separator to effect the desired separation of resin and coal particles is generally difficult to be quantified other than in terms of cyclone diameter as mentioned above. However, the force in the conical section of a typical cyclone near the apex is frequently quoted as being from several hundred to several thousand times the force of the earth's gravitational field, depending upon the operating pressure of the cyclone.

It is well known that the separation efficiency of classifying cyclones decreases with particle size. It is an embodiment of the present invention, however, that a cyclone of sufficient size, with appropriate orifice ratios and under sufficient operating parameters, be employed to reject coal particles smaller than about 50 microns and preferably smaller than 25 microns. In a preferred embodiment of the present invention, cyclones being from about two to four inches in diameter and being operated at about 20 to 30 pounds per square inch are employed without the use of any reagents, chemicals or flotation aids or agents.

In recent years a second type of cyclonic separator, commonly referred to as a gravimetric cyclone, water-only cyclone, or hydrocyclone, has been employed for mineral dressing and coal preparation in which a truncated cyclone body usually with a large included angle near the apex (greater than 90 degrees) is employed to separate minerals according to their specific gravity. Such hydrocyclones typically employ a vortex finder of adjustable length positioned relatively deeply within the body of the hydrocyclone to skim off or separate out the less dense particles from the bed of minerals as the bed moves across the conical portion of the hydrocyclone toward the apex. When employed in the process of the present invention, the typical hydrocyclone is less effective than a classifying cyclone of the same diameter because the long vortex finder accepts sufficient quantities of lower gravity coal particles to yield a less than pure resin concentrate in the overflow of the cyclone. If, as is evident to those skilled in the art, the vortex finder of a hydrocyclone is shortened to the point that it effectively rejects the coal particles, such hydrocyclone then tends to operate in the manner of a classifying cyclone. The utilization of a hydrocyclone whose vortex finder has been shortened sufficiently to act in the manner of a classifying cyclone and yield a high-purity resin concentrate is specifically an embodiment of the present invention.

The present invention allows one to prepare resin concentrates of such high purity that they may be used directly for tackifying and resinous applications without the need for additional, expensive refining, such as solvent refining as has heretofore been the case. Depending upon the concentration of slurry fed to the cyclonic separator, the size and operating parameters of the cyclonic separator and the method of dewatering the resin concentrate after separation, the process of the present invention can be utilized to prepare resin concentrates of purity far in excess of that heretofore attainable by prior art processes i.e., from 55 to 60 weight percent resin on a dry basis, and typically in excess of 95 weight percent resin and not atypically in excess of 99.5 weight percent resin. Such concentrates are significantly more pure in resin content than products by any other concentration process with which the art is familiar.

The present invention also allows for the separation of resin without the costly use of reagents, chemicals or flotation aids or agents, the cost of which can greatly detract from the economic attractiveness of a method.

Another significant advantage of the present invention is its ability to process coal and to recover resin particles without concern as to particle size. Since the fractured resin particles found in most mine run coal are individually small, (almost all being less than 18 mesh), it may be advantageous in some instances to prescreen the coal and to recover and process coal fines smaller than about 1 to 6 millimeters in size (i.e., from about 28 mesh to about ¼ inch) by the process of this invention. Such pre-screening reduces the quantity of coal to be processed and also increases the concentration of the resin particles in the more easily handled coal fines.

The present invention may be more fully understood by reference to the accompanying drawings illustrating various embodiments of the same.

FIG. 1 illustrates one embodiment of this invention wherein resin bearing coal, preferably screened to exclude particles larger than about 1 to 6 mm in diameter, and which, if desired, can have been subjected to an initial separation, is introduced through line 11 into mixing zone 13 where it is mixed, by any of numerous means including pumps, mechanically agitated reactors, eductor-equipped hoppers, and the like, with a non-solvent liquid, in this case water, introduced through line 12. The resulting mixed slurry, preferably containing from about 1 percent to 50 percent solids by weight, more preferably from about 2 to 20 weight percent, and most preferably from about 3 to about 15 weight percent solids, is removed through line 14 to separating zone 15. This zone 15 can contain one or more cyclonic separators, i.e., classifying cyclones, preferably operating at a pressure of between about 4 and about 60 p.s.i. Each cyclone is of a size suitable to separate the resin and coal without undue contamination of coal fines in the resin-containing cyclone overflow. Separators operating at relatively low pressure, typically between about eight and thirty p.s.i., are usually most advantageous in minimizing cyclone wear without impairing the effectiveness of the resin/coal separation.

The separator overflow is removed through line 16 to resin dewatering zone 17 which can comprise screens, sieves, filters, centrifuges or the like, wherein the resins are dewatered. The dewatered resin concentrate is then removed through line 18 for subsequent drying and use. The water stream 19 may be recycled through line 12 to mixing zone 13 if desired.

The separator underflow, containing virtually all the coal particles, is removed from zone 15 through line 20 to an adjacent coal dewatering zone which can also comprise screens, sieves, centrifuges, filters, or the like. In that zone the coal is dewatered and the dewatered coal is removed for subsequent use or disposal. The water stream from the coal dewatering together with that from the dewatered resin, line 19, may be recycled through line 12 to mixing zone 13.

In order to prevent a build-up of undesirable coal fines and slimes in the water circuit, which, among other things, may increase the apparent specific gravity or viscosity of the water media in separating zone 15 to an undesirably high value, it may be desirable to insert in lines 19 and/or 12 a system to facilitate bleeding the slimes and undesirable coal fines to a settling pond or other disposal means, as will be obvious to those skilled in the art of handling wash waters from coal preparation and washing plants.

Figure 2:
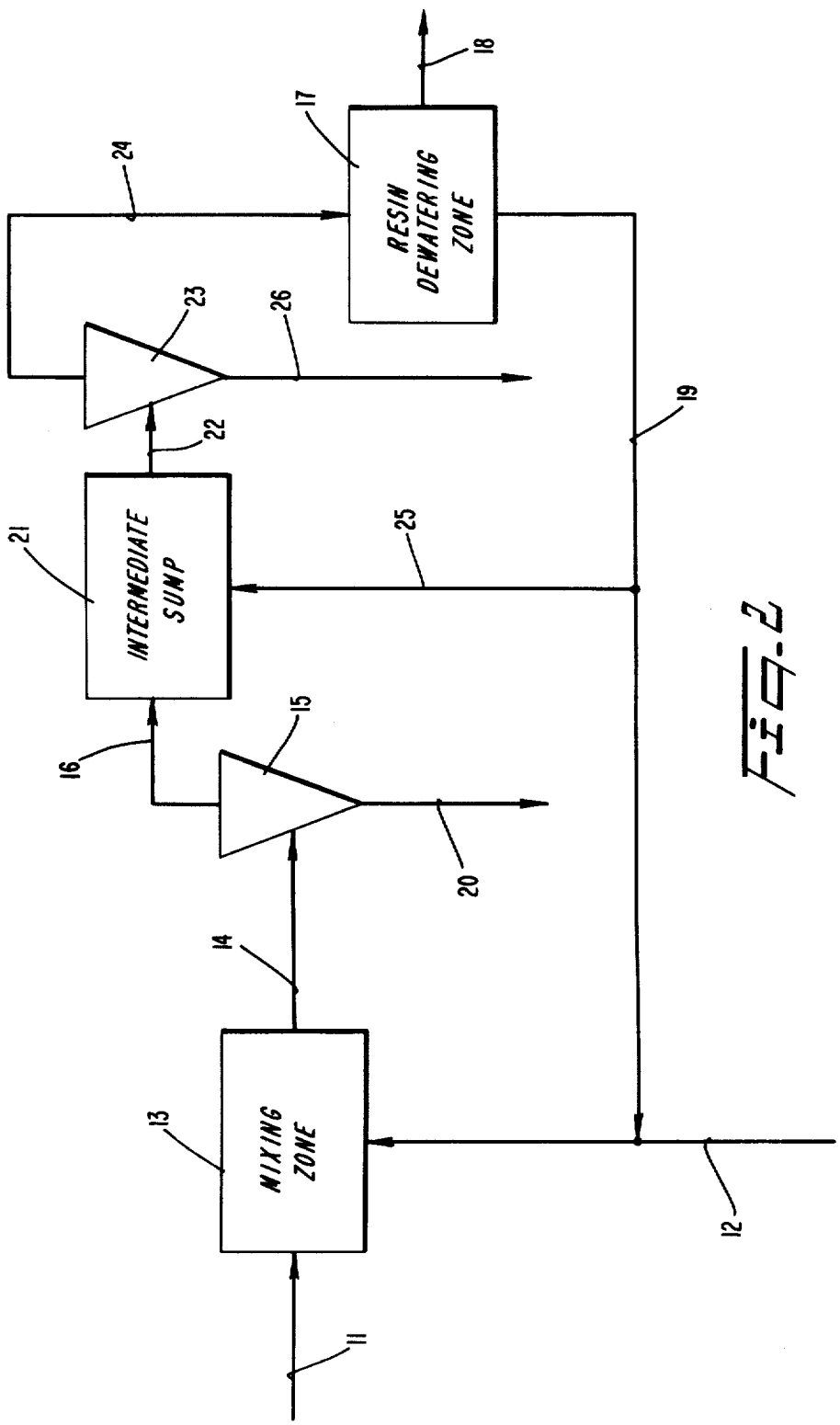
FIG. 2 schematically depicts a set-up in one embodiment of the present invention wherein two centrifugal separating zones are employed.

In order to improve the purity of the resin concentrate prior to dewatering in zone 17, it may be desirable to insert a second separating zone, comprising one or more cyclonic separators, such as classifying cyclones, between zones 15 and 17 as illustrated in a second embodiment of the present invention shown in FIG. 2. In FIG. 2 the resin containing overflow from the first separation zone 15 is removed through the line 16 to an intermediate sump 21 from which it may be removed, as by pumping, through line 22 to the second separating zone 23. This zone 23 can contain one or more cyclonic separators operating at a pressure of between 4 and 60 p.s.i. If required, water may be introduced into the intermediate sump 21 by means of line 25, but generally little or no additional water is required by the introduction of a second separating zone 23 into the process of the present invention. Preferably, the cyclonic separators in such secondary separating zone 23 are smaller in diameter than the cyclones employed in zone 15 in order to effectively reject the finer coal particles. The cyclone overflow is removed through line 24 to resin dewatering zone 17, which comprises screens, sieves, filters, centrifuges and the like, and wherein the resins are dewatered. The underflow stream 26 from the second separating zone 23, containing additional fine coal particles, may be combined with the underflow stream in line 20 from the first separating zone 15 for subsequent coal dewatering and disposal.

The use of a second separating zone cannot only improve the purity of the resin concentrate, but may also reduce the volume of liquid fed to resin dewatering zone 17.

FIG. 3 illustrates another embodiment of the present invention in which a secondary separation zone 31 is employed in the process. The second separating zone 31 is inserted between first separating zone 32 and resin dewatering zone 33, but without the use of an intermediate sump zone as in zone 21 of FIG. 2. In the depicted embodiment of FIG. 3, resin bearing coal, preferably screened to exclude particles larger than about 1 to 6 mm in diameter, is introduced through line 34 into mixing zone 35 where it is mixed, by any of numerous means including pumps, mechanically agitated reactors, eductor-equipped hoppers, and the like, with water being introduced through line 36. The resulting mixed slurry, containing from about 1 percent to 50 percent solids by weight, more preferably from 2 percent to 20 percent by weight, and most preferably from about 3 to 15 weight percent is removed through line 37 to the first separating zone 32. This zone 32 contains one or more cyclonic separators, (i.e., classifying cyclone) operating at a pressure of between about 8 to 120 p.s.i., preferably between about 10 and 80 p.s.i., and typically about 60 p.s.i.

The embodiment shown in FIG. 3 in which two or more cyclonic separators are connected in series without an intermediate sump and pump requires that the pressure in the line 37 at the inlet to the first separating zone 32 be sufficient so that the pressure in the overflow stream 38 from the first separating zone is adequate to operate also the second separating zone 31 and effect a good resin/coal separation. For the purposes of the illustration of this embodiment, it shall be assumed that the classifying cyclones comprising the first separating zone 32 and those comprising the second separating zone 31 are of the same size and configuration such that the pressure drop between the inlet and overflow orifice (vortex) of each separating zone is approximately equal. However, it can be readily seen that the size and configuration of the cyclones employed in zones 32 and 31 respectively should be chosen to optimize the process and to prepare a resin concentrate of optimal purity irrespective of the pressure drop across each separating zone.

The overflow from the first separation zone 32 is removed through line 38, at a pressure between about 4 and 60 p.s.i., preferably between about 5 and 40 p.s.i., typically about 30 p.s.i., and introduced directly into a second separating zone 31. This zone contains one or more cyclonic separators, i.e., classifying cyclones. The resin containing overflow from zone 31 is removed through line 39, typically at or near atmospheric pressure, to resin dewatering zone 33 comprising screens, sieves, filters, centrifuges or the like, wherein the resins are dewatered and removed through line 40. The water stream 41 together with that from the dewatered coal may be recycled through line 36 to mixing zone 35.

The embodiment of the invention shown in FIG. 3 in which two cyclonic separators are connected in series without the use of an intermediate sump is particularly advantageous with respect to the force acting to reject the coal fines in the first separating zone 32. The pressure drop between the inlet and the underflow orifice (apex) of zone 32 is approximately double that of zone 15 in the embodiment shown in FIG. 1, i.e., between about 8 and 120 p.s.i., preferably between about 10 and 80 p.s.i., and typically about 60 p.s.i. As compared with the embodiment shown in FIG. 1, this pressure drop increases, typically doubles, the force acting in the conical section of the first separating zone and greatly enhances the rejection of finer coal particles out the apex of the first separating zone 32 and into the underflow stream 42.

At the same time the pressure drop between the inlet and overflow orifice (vortex) of the first separating zone 32 remains approximately the same as in the embodiment of FIG. 1 without a second separating zone, i.e., between about 4 and 60 p.s.i., preferably between about 5 and 40 p.s.i., typically about 30 p.s.i. This provides for good resin separation and recovery in zone 32 as well as providing sufficient pressure, i.e., between about 4 and 60 p.s.i., preferably between about 5 and 40 p.s.i., and typically about 30 p.s.i., to operate the second separating zone 31 in a conventional manner.

It is a special feature of the process of the present invention that the cyclonic separation of resin from coal is enhanced when the cyclone underflow orifice (apex) is relatively large and unrestricted. In this event the apex discharges in a spray configuration and air is concomitantly induced to flow upward through the underflow orifice exiting through the overflow orifice (vortex). The air, so induced, aids in the air-lift of the resin particles to the air/water interface in the conical portion of the cyclonic separator, and thence into the overflow stream. Depending upon cyclone design and configuration, it may be desirable, and is contemplated in one embodiment of this invention, to bleed air, or some other suitable gas which is relatively inert in the existing environment, into the inlet side or into the apex of the cyclone in order to assist resin particles, particularly the larger ones, to move to the air/water interface, and thence to enter the overflow stream. This aforedescribed air admixing decreases the apparent density or effective density of the resin particles and adds to separation efficiency.

Conversely, a string- or rope-discharge of coal particles from the underflow orifice of a cyclonic separator serves to inhibit the preparation of a high purity resin concentrate in part because sufficient air cannot be induced into the core of the cyclonic separator. Under such conditions, and especially in the case of a heavy rope discharge, a significant portion of the large resin particles would be rejected out the underflow orifice (apex) of the cyclone along with the coal particles.

A further advantage of the present invention is that the mixing zone in which the resin-bearing coal is slurried in water, and also any coal dewatering zones may be located at points far removed from the separation zones 15, 23, 31 and/or 32. This is true since the coal slurry is readily pumpable and may be easily moved by pipeline. Transferring the coal in slurry form is much easier, less expensive, and far less cumbersome than utilizing conveyors and other solids handling equipment to move dry coal solids. Thus an additional advantage of the present invention is that the process permits the resin to be easily separated from the coal at a location distant from the coal source and does not depend upon resin recovery at a coal washing or preparation plant as in traditional floatation processing.

In a preferred embodiment of the present invention, the resin dewatering zone comprises a sieve bend, a horizontal or inclined screen or sieve, or the like. These may be either static, vibrating or rotary, such that the slurry of resin concentrate introduced to the resin dewatering zone is dewatered by flowing the slurry of resin concentrate over the sieve or screen of such mesh size or slot opening that the undesirable fine coals and slimes are allowed to pass through the sieve or screen, thus enhancing the purity of the resin concentrate so produced.

When the resin slurry is dewatered over sieves or screens which are inclined, it is preferred that they be inclined at an angle between 5 and 75 degrees to the horizontal, and most preferably between about 10 and 55 degrees to the horizontal. At such an incline, the very fine resin particles generally tend to ride up and over the sieve or screen openings and are thus agglomerated into the mass of the resins on the surface. The quantitative recovery of the resin concentrate is thus enhanced without affecting the purity of said concentrate.

The following examples are given as specific illustrations of the invention. It should be understood, however, that the specific details set forth in the examples are merely illustrative and in nowise limitative. All parts and percentages in the examples and the remainder of the specification are by weight unless otherwise specified.

EXAMPLE I

Utilizing the embodiment shown in FIG. 1, 29.4 pounds of resin bearing coal fines containing 10.4 weight percent resin are mixed with 20.0 gallons of water to yield a slurry suspension of 15.0 weight percent solids. The slurry is pumped at 30 p.s.i. through a two inch classifying cyclone whose underflow orifice (apex) has been enlarged to permit a spray discharge whose included angle is about 125 degrees. The cyclone overflow is recovered and dewatered through a 270 mesh sieve. The resulting resin concentrate is dried and analyzed, and found to contain 98.3 weight percent resin. The yield is 84 percent of theory.

EXAMPLE II

Utilizing a variation of the embodiment shown in FIG. 2, 43.8 pounds of resin-bearing coal containing 6.3 weight percent resin are mixed with 100.0 gallons of water to yield a slurry suspension of 5.0 weight percent. The slurry is pumped, at 30 p.s.i., through a two-inch classifying cyclone whose underflow orifice gives a spray discharge whose included angle is about 100 degrees. The cyclone overflow is recovered and dewatered through a 200 mesh sieve. The resulting resin concentrate is dried and analyzed, and found to contain 99.5 weight percent resin.

While the present invention has been described in detail in terms of separating resins from resin-bearing coal, the present invention can find applicability in the separation of any suitable mixture of solid mineral substances, e.g., an admixture of mineral particles where one particle is largely unwettable by a non-solvent liquid and where the other mineral particle is wettable by the same non-solvent liquid.

Thus, although the invention has been described with regard to preferred embodiments, it is to be understood that variations and modifications may be resorted to as will be apparent to those skilled in the art. Such variations and modifications are to be considered within the preview and the scope of the claims appended hereto.

What is claimed is:

1. A process for the separation of resin from coal material, which comprises
    mixing a resin-containing coal material with a non-solvent liquid to form a slurry, and
    subjecting the slurry to centrifugal force in the presence of a gas.

2. The process of claim 1 wherein the slurry contains from about 1 to about 50 weight percent solids.

3. The process of claim 1 wherein the non-solvent liquid is water.

4. The process of claim 1 wherein the gas is air.

5. The process of claim 1 wherein a resin-bearing coal material is mixed with a non-solvent liquid to form a slurry,
    the slurry is subjected to centrifugal force in the presence of a gas to thereby separate the resin from the coal material, and
    the separated resin is recovered and the non-solvent liquid removed from the recovered resin to thereby obtain a resin concentrate.

6. The process of claim 1 or 5 wherein prior to being subjected to centrifugal force the slurry is maintained as a solids-in-liquid suspension by agitation.

7. The process of claim 6 wherein the agitation is achieved via circulation of the slurry.

8. The process of claim 6 wherein the agitation is achieved by means of the injection of air.

9. The process of claim 5 wherein the non-solvent liquid is water.

10. The process of claim 5 wherein the gaseous medium is air.

11. The process of claim 1 or 5 wherein the centrifugal force is effected by a classifying cyclone.

12. The process of claim 11 wherein each cyclone separator is operated at a pressure of from about 4 to about 60 p.s.i.

13. The process of claim 12 wherein each cyclone separator is operated at a pressure of from about 5 to about 40 p.s.i.

14. The process of claim 5 wherein the slurry is subjected to centrifugal force in a first centrifugal separation zone and the separated resin therefrom is subjected to centrifugal force in a second centrifugal separation zone prior to removal of non-solvent liquid therefrom.

15. The process of claim 14 wherein the separated resin from the first centrifugal separation zone is passed directly to a second centrifugal separation zone.

16. The process of claim 15 wherein classifying cyclone separators are employed in each separation zone, with the operating pressure of the classifying cyclone separator in the first separation zone ranging from 8 to about 120 p.s.i., and the operating pressure in the second separation zone ranging from 4 to about 60 p.s.i.

17. A process for the separation of resin from coal material comprising
    mixing a resin-containing coal material with water to thereby form a slurry, and
    separating the resin from the coal material by subjecting the slurry to centrifugal force in the presence of air.

18. The process of claim 17 which further comprises recovering the separated resin and dewatering same to thereby obtain a resin concentrate.

19. The process of claim 5 or 18 wherein the resin concentrate comprises at least 75% resin by weight.

20. The process of claim 5 or 18 wherein the resin concentrate comprises at least 95% resin by weight.

21. The process of claim 18 wherein the slurry is subjected to centrifugal force in a first centrifugal separation zone and the separated resin therefrom is subjected to centrifugal force in a second centrifugal separation zone prior to dewatering.

22. The process of claim 18 wherein the separated resin from the first centrifugal separation zone is passed directly to a second centrifugal separation zone.

23. The process of claim 18 wherein the centrifugal force is applied by means of a classifying cyclone separator.

24. The process of claim 23 wherein the cyclone separator is operated at a pressure of from about 4 to about 60 p.s.i.

25. The process of claim 24 wherein the cyclone separator is operated at a pressure of from about 5 to about 40 p.s.i.

26. The process of claim 22 wherein classifying cyclone separators are employed in each separation zone, with the operating pressure of the cyclone separator in the first separation zone ranging from 8 to about 120 p.s.i., and the operating pressure in the second separation zone ranging from 4 to about 60 p.s.i.

27. A process for the separation and recovery of resin from resin-bearing coal material comprising
   mixing a resin-containing coal material with water to thereby form a slurry,
   separating the resin from the coal material by subjecting the slurry to centrifugal force in the presence of air, wherein the centrifugal force is induced by a classifying cyclone separator, and
   recovering the separated resin and dewatering same to thereby obtain a resin concentrate which comprises at least 95% resin by weight.

28. A process for the separation of resin from coal material, which comprises
   mixing a resin-containing coal material with a non-solvent liquid to form a slurry,
   subjecting the slurry to centrifugal force in the presence of a gas to thereby separate the resin as overflow from the coal material as underflow, and
   recovering the separated resin and removing non-solvent liquid therefrom to thereby obtain a resin concentrate comprised of at least 75% by weight resin.

29. The process of claim 28, wherein the resin concentrate obtained is comprised of at least 95% by weight resin.

30. The process of claim 28, wherein the non-solvent liquid is water.

31. The process of claim 28, wherein the gas is air.

32. The process of claim 28, wherein the separation process is conducted in the absence of a wetting agent.

33. The process of claim 28, wherein the centrifugal force is effected by at least one classifying cyclone having a diameter of less than about 6 inches.

34. A process for separating resin from coal material comprising,
   mixing a resin-containing coal material with water to form a slurry,
   subjecting the aqueous slurry to centrifugal force in the presence of air to thereby separate the resin as overflow from the coal-material as underflow, and
   recovering the resin overflow and dewatering same to thereby obtain a resin concentrate comprised of at least 75% by weight resin.

35. The process of claim 34, wherein the resin concentrate is comprised of at least 95% by weight resin.

36. The process of claim 34, wherein the process is conducted in the absence of a wetting agent.

37. The process of claim 34, wherein the centrifugal force is effected by at least one classifying cyclone operated at a pressure in the range of from about 4 to about 60 p.s.i.

38. The process of claim 37, wherein the centrifugal force is effected by a classifying cyclone having a diameter of less than about 6 inches.

39. The process of claim 34, further comprising subjecting the aqueous slurry to centrifugal force in a first classifying cyclone operated at a pressure ranging from about 8 to about 120 p.s.i., with separated resin therefrom being subjected to centrifugal force in a second classifying cyclone operated at a pressure ranging from about 4 to about 60 p.s.i. prior to being dewatered.

* * * * *